J. E. MAYNADIER.
BILLIARD-TABLE CUSHIONS.

No. 187,656. Patented Feb. 20, 1877.

UNITED STATES PATENT OFFICE.

JAMES E. MAYNADIER, OF BOSTON, MASSACHUSETTS, ASSIGNOR TO HUGH W. COLLENDER, OF NEW YORK, N. Y.

IMPROVEMENT IN BILLIARD-TABLE CUSHIONS.

Specification forming part of Letters Patent No. 187,656, dated February 20, 1877; application filed January 11, 1877.

*To all whom it may concern:*

Be it known that I, JAMES E. MAYNADIER, of Boston, in the county of Suffolk and State of Massachusetts, have invented an Improvement in the Art of Making Billiard-Table Cushions, of which the following is a full, clear, concise, and exact description, reference being had to the accompanying drawings, making a part hereof.

Previous to my invention it has been customary, in the art of making that kind of billiard-table cushions composed of a rubber cushion-strip, having combined with it a face-hardening strip located within the mass of rubber, to either mold in the face-hardening strip or to mold the rubber around a core, so as to form a cavity or hole in the molded and vulcanized cushion-strip, into which the face-hardening strip or device was subsequently put, either by drawing or forcing it endwise into the hole cored out of the rubber; or, secondly, by cutting the rubber open so as to permit the insertion sidewise of the face-hardening strip, and then reuniting the severed portions of the vulcanized rubber strip.

My invention relates to a novel method or mode of making the kind of cushions referred to, and consists in molding the rubber strip or cushion-body with a flap, or in such a form in cross-sections that when folded over onto itself, and around a suitable face-hardening strip, a cushion of the usual and proper shape will be produced, composed of a rubber body and incorporated face-hardening strip, substantially as will be hereinafter more fully explained.

To enable those skilled in the art to which my invention relates to practice it, I will more fully describe my improvement in the art by reference to the accompanying drawings, in which—

Figure 1:
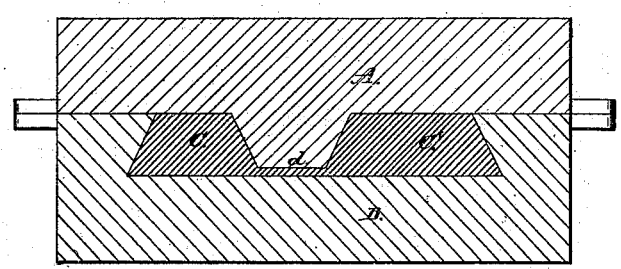
Figure 2:
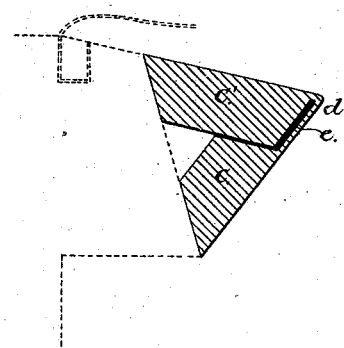

Figure 1 shows, in cross-section, one form of mold (and shape of rubber strip) for the production of a rubber cushion-strip according to my improved mode of making cushions; and Fig. 2 shows, in cross-section, a cushion made according to my mode of manufacture.

At Fig. 1, A and B are the two parts of a metallic mold made, except as to the peculiar shape in cross-section, about as usual, and in which the rubber is put in a green state, and therein molded and vulcanized. The mass of vulcanized rubber is represented (by the white space) as being in the mold, and is, as will be seen, composed of two properly-shaped portions, C and C′, connected at their bases by a thin strip or layer, $d$. At Fig. 2 is shown the same rubber strip $c\ c'\ d$, turned or folded over onto itself, and so as to surround and confine in place a metal face-hardening strip, $e$, the surfaces of the rubber strip, which are brought together at $f$, being either cemented together or otherwise properly held adjacent, so as to keep the parts properly in the cushion-like shape illustrated.

The shape of the rubber strip may, of course, be varied, and any other sort of face-hardening device than shown (arranged within the rubber mass) may be employed without departing from the spirit of my invention, the gist of which rests in the art of making this kind of cushion by first molding the rubber in such a shape that when folded over onto itself and around a suitable face-hardening device, substantially the kind of cushion referred to will be produced.

The dotted lines at Fig. 1 indicate how the shape may be changed by increasing the size or bulk of the portion C, and decreasing C′, and various modifications of form, all involving my invention, may readily be suggested.

What I claim as my improvement in the art of making rubber billiard-cushions, having incorporated face-hardening devices, is—

Molding the rubber strip with a flap, or in form as shown in cross-section, to fold over onto itself and around a face-hardening strip, substantially as set forth.

JAMES E. MAYNADIER. [L. S.]

Witnesses:
 GEO. O. G. COALE,
 J. BROWN LORD.